United States Patent [19]

Koehler

[11] Patent Number: 4,613,369
[45] Date of Patent: Sep. 23, 1986

[54] POROUS METAL ARTICLE AND METHOD OF MAKING

[75] Inventor: Paul C. Koehler, Dryden, N.Y.

[73] Assignee: Pall Corporation, Glen Cove, N.Y.

[21] Appl. No.: 781,928

[22] Filed: Sep. 30, 1985

Related U.S. Application Data

[62] Division of Ser. No. 625,295, Jun. 27, 1984, Pat. No. 4,562,039.

[51] Int. Cl.$^4$ ............................................. B22F 3/00
[52] U.S. Cl. .................................... 75/246; 148/12 E; 148/135; 148/136; 419/2; 419/3; 419/8; 419/23; 419/38; 419/47; 419/66; 427/436; 428/312.8; 428/549; 428/550
[58] Field of Search ..................... 419/2, 3, 8, 23, 38, 419/47, 66; 75/246; 148/12 E, 135, 136, 37, 38; 427/436; 428/312.8

[56] References Cited

U.S. PATENT DOCUMENTS

| | | | |
|---|---|---|---|
| 2,241,095 | 5/1941 | Marvin | 419/2 |
| 2,251,410 | 8/1941 | Koehring et al. | 419/2 |
| 2,267,918 | 12/1941 | Hildabolt | 29/189 |
| 2,290,338 | 7/1942 | Koehring | 419/2 |
| 2,383,066 | 8/1945 | McDermott | 183/44 |
| 2,457,051 | 12/1948 | Le Clair | 29/148 |
| 2,547,371 | 4/1951 | Brennan | 419/2 |
| 2,627,531 | 2/1953 | Vogt | 419/2 X |
| 2,681,375 | 6/1954 | Vogt | 428/539.5 X |
| 2,906,803 | 9/1959 | Brown | 419/2 |
| 2,925,650 | 2/1960 | Pall | 29/160 |
| 2,979,400 | 4/1961 | Mouwen | 75/222 |
| 2,980,532 | 4/1961 | Martensson et al. | 419/43 X |
| 3,002,834 | 10/1961 | Pasquale | 419/43 X |
| 3,049,796 | 8/1962 | Pall | 29/183.5 |
| 3,061,917 | 11/1962 | Pall | 29/401 |
| 3,241,681 | 3/1966 | Pall | 210/493 |
| 3,323,915 | 6/1967 | Lambert et al. | 419/2 |
| 3,393,096 | 7/1968 | Jost | 419/2 |
| 3,409,473 | 11/1968 | Weber et al. | 419/2 |
| 3,907,513 | 9/1975 | Sheinberg | 428/549 |
| 4,169,059 | 9/1979 | Storms | 210/493 |
| 4,435,483 | 3/1984 | Ahslund et al. | 419/2 |
| 4,443,404 | 4/1984 | Tsuda et al. | 419/2 |
| 4,552,719 | 11/1985 | Morimoto et al. | 419/2 |
| 4,562,039 | 12/1985 | Koehler | 419/2 |

FOREIGN PATENT DOCUMENTS

| | | |
|---|---|---|
| 46-8087 | 1/1971 | Japan. |
| 759788 | 10/1956 | United Kingdom. |
| 901261 | 7/1962 | United Kingdom. |
| 1112285 | 5/1968 | United Kingdom. |
| 1214226 | 12/1970 | United Kingdom. |
| 1258787 | 12/1971 | United Kingdom. |

OTHER PUBLICATIONS

"Inco Nickel Powders-Properties and Uses", The International Nickel Co., Inc.
"Roll Compacting of Metal Powders", ASM Metals Handbook, Ninth Edition, vol. 7.
Knoop, Walter V., "Principles and Variables Involved in Roll Compacting of Powders", in *1981 National Powder Metallurgy Conference Proceedings*, held May 3-6 1981 Philadelphia, PA.

*Primary Examiner*—Stephen J. Lechert Jr.
*Attorney, Agent, or Firm*—Leydig, Voit & Mayer, Ltd.

[57] ABSTRACT

A method of making a porous metal article is disclosed comprising:
(a) applying a stabilized suspension of a dispersed metal particulate in a fluid medium to a porous metal support;
(b) working the support to fill the openings with the stabilized suspension and remove entrained gas;
(c) heating the filled support to dry the stabilized suspension and provide the filled support with green or unsintered strength;
(d) preferably compressing the dried, filled support to provide better contact between adjacent particles and greater mechanical strength; and
(e) sintering the compressed, dried, filled support to remove volatile material and to fuse the individual particles of the metal particulate to the metal support and to each other.

The porous metal articles find particular use as filters. They comprise a porous metal support and metal particulate material with the individual particles sinter bonded to each other and to the support. Preferably, the porous articles are formed from austenitic stainless steel containing less than 0.03 parts by weight carbon, have F2 pore ratings at beta=100 of from about 0.1 to about 50 micrometers and are capable of being formed about a bending radius of five or less times the thickness of the article while maintaining their integrity.

37 Claims, 2 Drawing Figures

POROUS METAL ARTICLE AND METHOD OF MAKING

This application is a division of application Ser. No. 625,295, filed June 27, 1984, now U.S. Pat. No. 4,562,039.

TECHNICAL FIELD

This invention relates to porous metal articles and a method for making them. More particularly, this invention is directed to reinforced metal filters and a method for making them.

BACKGROUND ART

Metal filters have long been used for a variety of applications. For example, porous stainless steel filters prepared from sintered metal particulate, e.g., stainless steel powder, have found use in a variety of processes where high pressure drops are acceptable and in applications where relatively fine filtration capability must be combined with mechanical strength, resistance to high temperatures and/or resistance to chemical attack. Such applications include the filtration of fine catalysts used in fluidized bed catalytic processes where elevated temperatures are encountered, e.g., fluid cat cracking, and in the manufacture of high fidelity recording tapes.

Still another use of such filters is in the filtration of molten resin used in the manufacture of polymeric films and fibers as, for example, polyester film.

Metal filters formed from wire mesh screen have also found use in applications where mechanical strength must be combined with resistance to high temperatures and/or resistance to chemical attack. This type of filter has the desirable characteristic of being readily corrugated to provide a high surface area filter for use in a limited space. It suffers, however, from low efficiency for removal of fine particles due to the relatively large pore sizes of the wire mesh structure.

The range of applications for metal filters could be greatly expanded if a filter structure combining the relatively fine pore structure of the conventional sintered metal particulate filter could be combined with the ability to corrugate or pleat the filter structure to increase the filter surface area available in a limited space while maintaining a fine pore structure. Further, if the pore sizes of conventional sintered metal filters could be further reduced, while concomitantly rendering such structures capable of being finely corrugated, the range of applications would be even further broadened.

Commercially available porous metal material prepared from metal powders is generally relatively thick. And, while such material can be bent into cylindrical shape, the inside radii (bending radii) of the resulting cylinder is generally no less than about seven times the thickness of the metal. As a result, corrugated (pleated) structures prepared from such material have limited practical application.

DISCLOSURE OF INVENTION

In accordance with the subject invention, porous metal articles and a method of forming them are provided which substantially overcome the limitations described above with regard to presently available metal filters. More specifically, the method in accordance with this invention provides a means for preparing porous metal articles or structures, particularly useful as filters, having pore sizes as fine as about 0.1 micrometer or even finer. The structures may be readily corrugated, thereby substantially increasing the surface area available in any given space, such as a filter housing.

In accordance with the invention, a method is provided for making a porous metal article useful as a filter comprising:

(a) applying a stabilized suspension of a dispersed metal particulate in a fluid medium to a foraminate metal support;

(b) working the support to fill the openings thereof with the suspension and remove entrained gas;

(c) heating the filled support to dry the stabilized suspension and provide the filled support with green or unsintered strength; and (d) sintering the dried, filled support to remove volatile material and to fuse the individual particles of the metal particulate to the support and to each other.

As used herein, the term "foraminate" means "perforate" or "containing holes". Examples of foraminate materials include perforated webs of metal, woven wire mesh and expanded metal sheet.

The sintering step can be carried out without the use of a setter material or the like as a substrate or support to maintain the particulate material in position on the support. Also, the filled support may be compressed prior to sintering to provide additional points of contact and increase the areas of contact between adjacent particles and between the particles and the surfaces of the foraminate support, thereby providing greater mechanical strength. The compression of the filled support prior to sintering also serves to reduce the pore size of the finished product. The formed article may also be compressed after sintering, either as an alternative to being compressed prior to sintering, or in combination with a pre-sintering compression step.

The porous metal articles in accordance with this invention comprise a foraminate metal support, preferably a metal wire mesh screen, and metal particulate material contained within the openings in the support, preferably substantially completely filling the openings. The individual particles of the particulate materials are sinter-bonded to each other and to the support and the resulting article, after sintering, is typically capable of being formed about a bending radius five times the thickness of the article or less while maintaining its structural integrity. As used herein, "bending radius" refers to the inner radius after bending. Maintaining its structural integrity refers to the ability of the article to maintain substantially the same pore rating after corrugation as it had prior to corrugation and, accordingly, when used as a filter, its filtration integrity.

The porous metal articles in accordance with this invention have F2 ratings as fine as about 0.1 micrometer at beta=100, as defined hereinafter. The structures can be made in thin, flexible form and, as noted above, can typically be formed about a bending radius five or less times the thickness of the article. Typically, when the structure has been compressed prior to sintering, a bending radius as small as two to four times the thickness of the structure may be used in forming the structure.

A preferred porous metal article in accordance with this invention is prepared from austenitic stainless steel particulate and an austenitic stainless steel wire mesh screen. The resulting articles have carbon contents of less than about 0.08 weight percent and preferably have low carbon contents of about 0.03 weight percent or less.

The foraminate metal support may comprise a perforated sheet, a slit or expanded sheet, or the like. Preferably a woven wire mesh screen is used.

BEST MODE FOR CARRYING OUT THE INVENTION

Figures 1, 2:
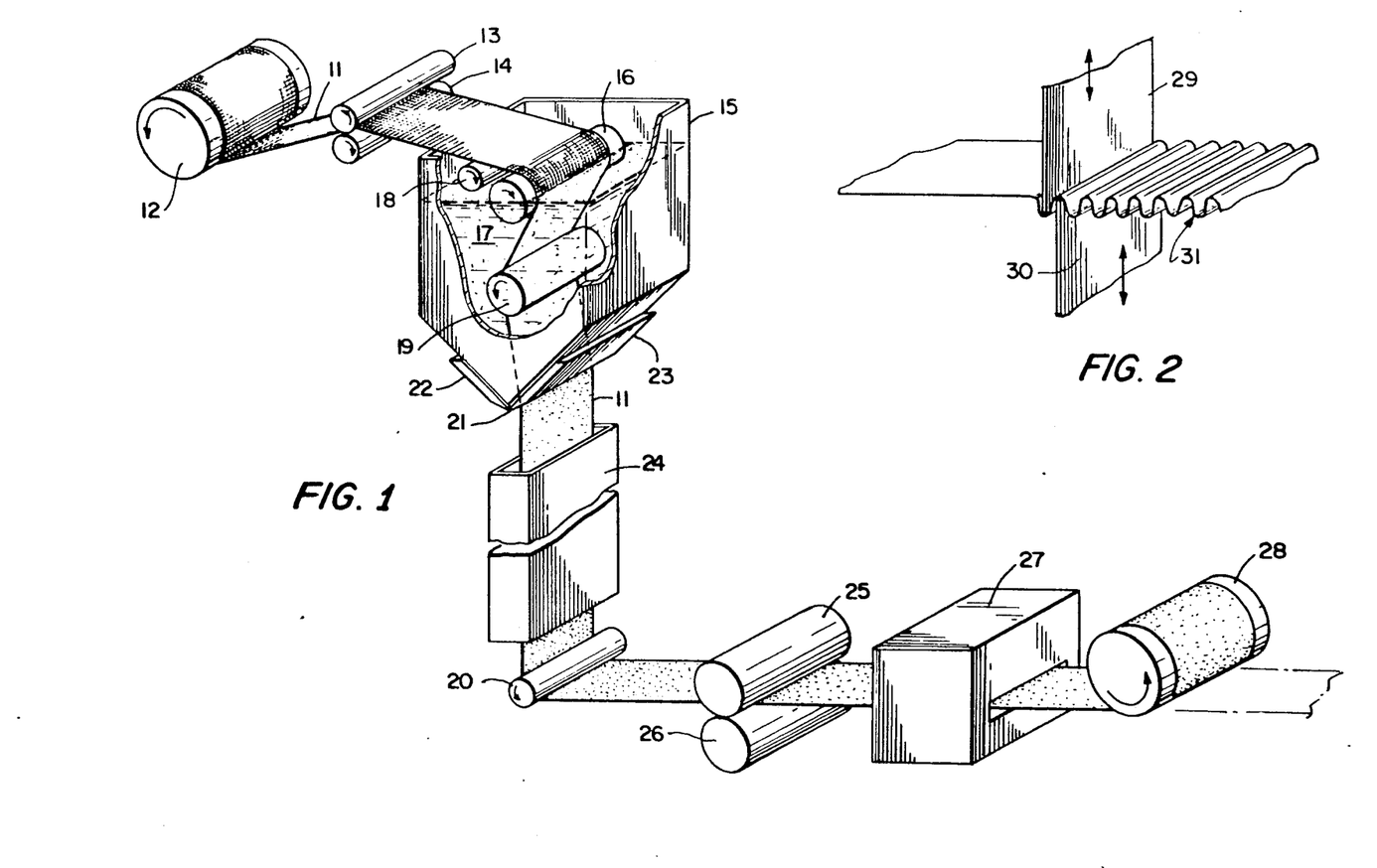
FIG. 1 is a schematic view of a preferred system useful for carrying out the method for preparing porous metal articles in accordance with this invention.
FIG. 2 is a schematic view of means for corrugating or pleating the porous metal articles in accordance with this invention.

In FIG. 1, a wire mesh screen 11 is shown being unwound from a roll 12 and being passed between rolls 13 and 14 which apply tension to the screen and can, if desired, be used to provide a light calendering of the wire mesh screen 11 prior to impregnation to ensure that the screen is of uniform thickness.

The wire mesh screen 11 is then carried into a container 15 where it passes over a roll 16 partially immersed in a bath 17 of a stabilized suspension of a dispersed metal particulate in a liquid medium containing a stabilizing/binding agent. The roll 16 picks up a layer of the metal particulate suspension from the bath 17 and applies it to one side of the wire mesh screen 11 and, as it passes over roll 16, at least partially fills the mesh openings in the screen 11 by extruding the metal particulate suspension through the mesh openings. The roll 18 serves to control the amount of the suspension picked up by the roll 16 and, correspondingly, the amount of the suspension extruded through the screen 11. The screen 11 then enters the bath 17 of the stabilized suspension of the metal particulate in the container 15. As the screen 11 passes generally downward through the bath 17, it is contacted on its opposite face by roll 19, which serves to force an additional portion of the metal particulate suspension through the screen 11 in the opposite direction.

The working undergone by the screen 11 as it passes over roll 16 on one side and then over roll 19 on the other side serves to work the suspension into the screen (or other foraminate metal support) by forcing the suspension of metal particulate into the openings in the wire mesh screen 11 (by extrusion, first in one direction and then the other), remove entrained gas and fill the screen openings with the wet metal particulate suspension. The roll 19 serves the additional function, in combination with the roll 20, of vertically aligning the now filled screen 11 for passage out of the slot opening 21 in the bottom of the container 15.

As the filled screen 11 exits the container 15, it passes between the doctor blades 22 and 23, which remove any excess of the metal particulate suspension. The doctor blades 22 and 23 can be adjusted to determine the pre-calendered and final product thickness.

After passing between the doctor blades 22 and 23, the wet, impregnated wire mesh screen 11 is carried vertically downward into the vertically aligned drying chamber 24.

As the filled metal screen 11 exits the container 15, it should be properly positioned so that after passing the doctor blades 22 and 23 it enters and passes through the dryer 24, where its liquid content is volatilized and the binding agent is dried, without contacting any surface, roll or other structure until it has been dried. This ensures that the uniform application of the suspension to the screen 11 is maintained until the carrying medium for the suspended or dispersed metal particulate material has dried and the metal powder particles picked up by the wire mesh screen 11 in the bath 17 are bound to each other and to the wire mesh screen 11 by the dried binding agent in the metal particulate suspension.

After exiting the dryer 24, the impregnated wire mesh screen 11 is carried under the roll 20 and then to calendering rolls 25 and 26 where it may be compressed as desired, following which it is passed through the sintering chamber 27 where it is subjected to an elevated temperature in an appropriate atmosphere for sufficient time to sinter the metal particles and form a structure of high mechanical strength and ductility. The resulting porous metal article or structure may then be rolled up on a wind-up roll 28, as indicated in FIG. 1, or, alternatively, it may be carried directly to downstream processing equipment where it may be, e.g., corrugated, following which it may be formed into a cylindrical form or the like. The wire mesh screen 11 is preferably moved through the system by the powered calendering or compression rolls 25 and 26 or, if the impregnated wire mesh screen 11 is not compressed prior to sintering, by the wind-up roll 28. Also, if desired, the dried, impregnated, wire mesh screen can be wound up by a powered wind-up roll and stored prior to calendering and sintering with the latter two steps carried out in a subsequent separate operation.

As noted above, the resulting porous metal article, after exiting the sintering chamber 27, can be formed into various shapes by use of suitable forming means, such as of the type shown generally in FIG. 2. In FIG. 2, the sintered, porous metal article is shown being passed between reciprocating vertical plates 29 and 30 which, acting in tandem, form the pleated or corrugated structure 31. Alternatively, corrugating or pleating may be carried out by other means, such as rolls cut with alternate ridges and grooves which are geared to run complement to each other. After corrugating or pleating, as generally shown in FIG. 2, the pleated, porous metal article or structure 31 can be formed into a variety of forms, e.g., and most typically, a cylindrical filter element.

Stabilized Suspension of Dispersed Metal Particulate:

The stabilized suspension used to prepare porous metal articles in accordance with this invention is comprised of a liquid medium, the metal particulate, a stabilizing agent and a binding agent. Preferably, a single constituent serves to both stabilize the dispersion of metal particulate and, upon drying of the suspension, to bind the individual particles to each other and to the porous metal support, thereby providing the requisite green or unsintered strength.

Typically, the stabilized suspension of the metal particulate in the liquid medium is prepared by the following general procedure.

The stabilizing/binding agent is combined with the liquid medium, preferably water for ease of use and disposal, in an amount such as to provide the requisite concentration of the stabilizing/binding agent in the liquid medium. The combination is mixed until uniform dispersion of the stabilizing/binding agent is obtained. The requisite amount of metal particulate material is then added and mixed to provide a uniform dispersion or suspension of the metal particulate in the liquid medium.

For some systems, this is all that is required. The suspension of metal particulate in the liquid medium containing the stabilizing/binding agent is stable after a thorough mixing has been completed. By stable or stabilized is meant that the metal particulate material is in suspension and will not settle out at a rate fast enough to adversely affect the application of the suspension to the porous metal support, i.e., a substantially uniform stabilized suspension is applied to the support.

For many applications it is preferred to add an additional component to set up the stabilizing/binding agent. For example, with Carbopol 934 (a polyacrylic acid available from B. F. Goodrich Chemicals Company), the addition of a neutralizing base, ammonium hydroxide, serves to neutralize the polyacrylic acid and increase the viscosity substantially, e.g., to about 10,000 to 50,000 centipoise. Such systems are very thixotropic, i.e., they have a very high apparent viscosity when undisturbed (low shear condition) and hence settling of the suspended particulate is retarded. When vigorously agitated, they have a low effective viscosity and, hence, are very effective in dispersing the metal particulate. Since these suspensions are very stable, they may be prepared in advance of the time they are used without settling out of the metal particulate. Alternatively, however, other stabilizing/binding agents may also be used which do not require the addition of another component to set up the suspension. For example, Carbopol 941 may be used without the addition of a neutralizing base. Viscosities in the range of from about 200 to about 50,000, preferably in the range of 200 to 10,000, centipoise, measured at the temperature of application, may be used.

The metal particulate and the foraminate metal support can be any of a variety of metal materials including alloys, various metals, such as nickel, chromium, copper, molybdenum, tungsten, zinc, tin, gold, silver, platinum, aluminum, cobalt, iron, and magnesium, as well as combinations of metals and metal alloys, including boron-containing alloys. Nickel/chromium alloys are preferred. Of these the AISI designated stainless steels which contain nickel, chromium and iron are more preferred. Particularly preferred are the AISI 300 series of stainless steels, commonly referred to as the austenitic stainless steels. Other stainless steels within the preferred class are the martensitic stainless steels, maraging steels, 17-7 and 17-4 PH stainless steels, ferritic stainless steels, and Carpenter No. 20 alloy. Other alloys within the preferred class of nickel/chromium alloys are the Hastelloys, the Monels and the Inconels, as well as a 50 weight percent nickel/50 weight percent chromium alloy. Multi-structured materials, such as duplexes of ferritic and austenitic stainless steel, may also be used. The metal particulate used may have various shapes, including dendritic, acicular and spherical, and will typically have particle sizes in the range of from about 1 to about 200 micrometers, preferably from about 1 to about 120 micrometers and more preferably from about 1 to about 40 micrometers. The size of the metal particulate chosen for a particular application is related to the size of the openings in the particular foraminate metal support chosen. Preferably, the size of the particles in relationship to the size of the openings in the support is such that from about 5 to about 15, more preferably 10 to 15, particles (at a minimum) can be placed in the openings side-by-side across the openings (in each direction).

In preparing stabilized suspensions for use in accordance with the invention, the apparent density of the loose metal particulate is used as a reference. Thus, if the dry density of the particulate is D grams per cubic centimeter, a suspension of the particulate at D grams per cubic centimeter (or 1,000 D grams per liter) may be considered as the reference concentration.

To illustrate this with an example, if the apparent density of the particulate or powder is 2.32 grams per cubic centimeter and it is desired to prepare one liter of suspension, then 2,320 grams of powder are used and enough of the liquid medium containing the stabilizing/binding agent is added to bring the total volume to one liter.

A suspension so prepared (at the reference concentration) contains just enough powder to fill the openings of the foraminate support at the dry density, i.e., the amount of the powder in the openings of the support will be sufficient to substantially completely fill the openings at a density equal to the apparent density of the dry powder. For some applications, somewhat lower concentrations are preferred, e.g., as low as 50 percent or less than the reference concentration, to provide partially filled porous articles. By "partially filled" is meant that while in the resulting porous product the particles will be present throughout the openings, the density of the powder within the openings of the foraminate support will be lower than the apparent density of the dry powder. This is a result of the concentration of the metal particulate in the stabilized suspension being lower than the reference concentration. A more preferred range for the concentration of the metal particulate in the stabilized suspension is from about 75 to about 100 percent of the reference concentration. Higher concentrations than the reference concentration may be used, particularly with very fine particulates. Porous articles formed from stabilized suspensions containing higher concentrations (than the reference concentration) of the metal particulate will have particles present throughout the openings but at a density higher than the apparent density of the dry powder. The weight ratio of the metal particulate to the liquid medium will typically be in the range of from about 5.5:1 to about 1:1, preferably from about 4.5:1 to about 2.5:1.

A variety of viscosity-increasing agents, which serve to stabilize the metal particulate suspension and also act as a binding agent when the liquid medium is removed by drying, may be used. Polyacrylic acid (available from B. F. Goodrich Chemicals Company under the trade name Carbopol) is particularly desirable. Carbopol 941 and Carbopol 934 are particularly preferred, Carbopol 941 having a molecular weight of about 1,250,000 and Carbopol 934 having a molecular weight of about 3,000,000. Other materials which can be used include carboxy methyl cellulose, carboxy ethyl cellulose, polyethylene oxide, sodium carboxy methyl cellulose, guar gum, alginates, methyl cellulose, and locust bean gum. In general, when water is used as the liquid medium, water compatible stabilizing/binding agents which volatilize and/or decompose substantially completely prior to or during sintering may be used.

Typically, the stabilizing/binding agent used will be present in the liquid medium in an amount of about 0.1 to about 5 weight percent, more preferably from about 0.2 to about 1 percent (based on the weight of the liquid and the stabilizing/binding agent). The ratio of the stabilizing/binding agent to the weight of particulate should be as low as possible to limit the carbon content introduced into the structure prior to sintering. This is particularly important with austenitic stainless steel, as discussed hereinafter.

Foraminate Metal Supports:

The foraminate metal supports serve as a base for application of the suspension of dispersed metal particulate and reinforce the formed porous article, thereby contributing to structural integrity and strength and enhancing flexibility and ability to be corrugated about small radii. Wire mesh screens, perforated sheet and expanded metals, typically having open areas in the range of from about 20 to 80 percent and thicknesses in the range of from about 1 to about 80 mils can be used as the support in the subject invention (1 mil=0.001 inches). Wire mesh screens are the preferred support.

Ideally, the wire mesh screen used in the subject invention is preferred to have a high open area and be strong and ductile. Square (one over, one under) mesh wire screens are satisfactory, although other types of weave, including twill, double twill, reverse weave, etcetera, can also be used.

Wire mesh screens having square weaves in the range of from 4×4 to 635×635 (the numbers referring to the number of wires per inch in each direction) are useful in the preparation of the porous articles of this invention. Also, other fine mesh screens having up to 200×1,400 wires per inch may be used. A typical square weave, offering good compromises with regard to the desired characteristics, is a 120×120×0.0023 screen (the last number referring herein to the diameter of the wire making up the screen, in inches). Screens of this type have nominal thicknesses equal to twice the thickness of the mesh wire diameter.

Porous Articles:

The porous metal articles in accordance with this invention comprise a foraminate metal support and metal particulate contained within the openings in the support, either partially or completely filling the openings, and optionally extending to a thickness greater than the thickness of the support. The individual particles are sinter-bonded to each other and to the support to form a flexible porous structure typically capable of being formed about a bending radius as small as about five or less, preferably three or less, times the thickness of the structure while maintaining the structural integrity of the article.

Porous metal articles or structures in accordance with this invention may be formed having F2 ratings at beta=100 (as hereinafter defined) of from about 50 micrometers to as small as about 0.1 micrometer. Preferred structures have F2 ratings at beta=100 of from about 0.5 to about 20 micrometers. When compressed prior to sintering, they may typically be formed about a bending radius about two to four times the thickness of the structure. Indeed, by the method in accordance with this invention it is possible to prepare porous articles capable of being folded or doubled back upon themselves, the surfaces being in contact in the immediate vicinity of the fold while still maintaining their structural integrity, i.e., a bending radius of less than 1 times the thickness of the article. Uncompressed structures prepared in accordance with this invention can typically be formed about a bending radius about five times the thickness of the structure and, in some instances, even smaller, i.e., down to about three times the thickness of the structure.

The size of particles chosen to use with a particular foraminate metal support is related to the size of the openings in the support. In general, the particles should be no more than one-fifth, preferably no more than one-tenth or one-fifteenth, the size of the smallest dimension, i.e., length, width or height, of the opening. For example, with a plain weave 10×10×0.032 inch (wire diameter size), the wire mesh screen has a nominal thickness of about 0.064 inches, corresponding to 1,626 micrometers, and the mesh openings have a width and length of about 0.068 inches, corresponding to 1,727 micrometers. Accordingly, for a minimum of ten particles for each dimension of the mesh opening, the particles should be no larger than about 163 micrometers in size.

By calendering or compressing the structure either prior to or after sintering, the distance between particles can be decreased and the pore sizes correspondingly decreased. Carrying out the compression prior to sintering provides additional points of contact and increases the area of contact between the individual particles and between the individual particles and the surfaces of the support in which they are contained. The result is a sintered article having enhanced mechanical strength better able to withstand subsequent forming steps such as pleating. In general, the value calculated as generally described above, i.e., the maximum average particle size to be able to fit five particles into the opening, is the maximum average particle size which should be used since coarser particles tend to form a more open structure with larger pore sizes and, correspondingly, less contact points and areas resulting in a structure with reduced strength.

Metal particulate in the range of from about 200 micrometers down to about 1 micrometer or even less is useful in the subject invention. Preferred particulate material size ranges from about 120 micrometers down to about 1 micrometer.

The porous articles in accordance with this invention have thicknesses prior to corrugation ranging from about 0.001 to about 0.125 inch, more preferably from about 0.001 to about 0.065 inch and more preferably from about 0.001 to about 0.05 inch.

The F2 test used in making pore size measurements is a modified version of the F2 test developed in the 1970s at Oklahoma State University (OSU). In the OSU test, a suspension of an artificial contaminant in an appropriate test fluid is passed through the test filter while continuously sampling the fluid upstream and downstream of the filter under test. The samples are analyzed by automatic particle counters for their contents of five or more preselected particle diameters and the ratio of the upstream to downstream count is automatically recorded. This ratio is known in the industry as the beta ratio.

The beta ratio for each of the five or more diameters tested may be plotted as the ordinate against particle diameter as the abscissa, usually on a graph in which the ordinate is a logarithmic scale and the abscissa is a $\log^2$ scale. A smooth curve is then drawn between the points. The beta ratio for any diameter within the range tested can then be read from this curve. Efficiency at a particular particle diameter is calculated from the beta ratio by the formula:

Efficiency, percent = 100 (1 − 1/beta)

As an example, if beta=100, efficiency=99 percent.

Unless otherwise stated, the removal rating cited in the examples presented herein is the particle diameters at which beta=100; hence, the efficiency at the removal rating cited is 99 percent.

In the modified F2 test, efficiencies in the range of from 1 to 20 micrometers were determined using as a test contaminant a suspension of AC fine test dust, a natural silicious dust supplied by the AC Spark Plug Company. Prior to use, a suspension of the dust in water was mixed until the dispersion was stable. Test flow rate was ten liters per minute per square foot of filter area. This same procedure was applied to filters having efficiencies of less than 1 micrometer by determining efficiencies at usually 1, 1.2, 1.5, 2, 2.5, and 3 micrometers and extrapolating the data to under 1 micrometer.

Efficiencies above 20 micrometers were determined using Potter's Industries Incorporated #3000 spherical glass beads suspended in MIL-H-5606 hydraulic fluid. These glass beads have a distribution of sizes ranging from less than 15 micrometers up to 30 micrometers. The viscosity of this fluid is approximately 12 centipoise at the test temperature of 100 degrees F. (37.8 degrees C.). Test flow rate was twenty liters per minute per square foot. The higher viscosity and flow rate serve to keep in suspension beads up to about 100 micrometers in diameter.

The porous articles in accordance with this invention, because of their mechanical strength combined with high ductility, can be formed into a variety of shapes for various commercial applications without loss of structural integrity. Not only can they be formed, e.g., pleated, about a very small radius as noted above, they can be formed into various shapes as required for particular applications, for example, into small diameter cylinders and the seam then welded. The porous articles in accordance with this invention may be joined and formed into various shapes by a variety of techniques, e.g., tungsten inert gas welding, brazing, resistance welding, swaging, electron beam welding, and the like. This distinguishes them from previously available structures of this general type since the ability to form the structures into various shapes, starting with flat sheets, particularly shapes with small radii, e.g., cylindrical shapes as fine as about one-sixteenth to one-eighth of an inch in diameter, was not heretofore possible.

Heretofore, porous filter media in sheet form prepared from stainless steel powder have, in general, been made by a method including a sintering step in which the stainless steel powder is in contact with a metal oxide surface setter material, such as alumina or other aluminum containing oxides. Surface contamination by the oxide generally occurs to some degree and can be highly deleterious. In accordance with the method of this invention, porous filter media can be prepared using a sintering step with no contact of the media with any oxide surface, for example, by hanging sheets of the media in the sintering furnace. Additionally, the use of a setter material such as alumina hinders the removal of carbon from the stainless steel porous article, an undesirable effect as discussed below.

The austenitic stainless steel porous articles in accordance with this invention are also characterized by having low carbon residues, i.e., less than about 0.08 weight percent, more preferably less than about 0.05 percent, and typically 0.03 percent or less, e.g., 0.015 percent. Low product carbon content is due to the very low concentration of binder resin which, in turn, is made possible by tailoring the weight ratio of the metal particulate to stabilizing/binding agent and liquid medium in the suspension. Typically, the amount of carbon present in the stabilized suspension by virtue of the stabilizing/binding agent is about 0.25 percent or less (based on the weight of the metal particulate). Part of this is lost during heat up in the sintering operation, and the residual quantity of carbon actually absorbed into the metal is reduced by chemical or physical processes which occur during sintering.

A low carbon content is particularly significant when working with austenitic stainless steels. Austenitic stainless steels with carbon contents greater than 0.08 weight percent are susceptible to precipitation of chromium carbides at the grain boundaries which can cause corrosion under many conditions. This susceptibility to corrosion is exacerbated when austenitic stainless steel containing greater than 0.08 weight percent carbon has been exposed to a temperature in the range of from about 900 to about 1,500 degrees F. (sensitization range). Typically, the lower the carbon content, the lower the susceptibility of the austenitic stainless steel to intergranular corrosion. Austenitic stainless steel having carbon contents in the range of from about 0.03 to about 0.08 weight percent are stable when they have not been subjected to a temperature in the sensitization range. However, when such steels are exposed to a temperature in the sensitization range, chromium carbides will precipitate at the grain boundaries and the metal then becomes susceptible to attack by various corrosive media. Austenitic stainless steels with carbon contents less than 0.03 weight percent will not precipitate significant amounts of chromium carbides at the grain boundaries even after they have been subjected to a temperature in the sensitization range, thus exhibiting a higher corrosion resistance than comparable austenitic stainless steels with carbon contents greater than 0.03 weight percent.

The process by which the carbon is removed during sintering from austenitic stainless steel porous articles is not fully understood. It has, however, been empirically determined that it is generally not economically practical to obtain products with less than about 0.015 to 0.08 percent of carbon if the starting mixture contains more than about 1 percent carbon. This is thought to be the case because, even if the carbonaceous binder melts and/or volatilizes, enough carbon is adsorbed by the metal from the liquid or vapor to undesirably increase its carbon content to levels well above 0.08 percent. For these reasons, the weight percent of the carbon in the stabilized suspension in the suspending medium to the weight of the particulate austenitic stainless steel should preferably be kept to less than about 0.25 percent of the weight of the metal particulate.

As noted above, products similar to those described above can be made using other metal materials. For example, woven bronze wire can be used with bronze powder. Other alloys or copper may be substituted for the bronze, either alone or in combination with tin or other low melting materials.

Processing Conditions:

The spacing of the doctor blades used to remove excess coating material is determined by the thickness of the porous metal support and the amount of the stabilized suspension which is deposited in the interstices of the support (mesh openings when a wire mesh screen is used), i.e., whether it is desired to only fill the openings with the stabilized suspension or whether a build-up of the stabilized suspension on one or both surfaces of the support is desired. Typically, the doctor blade spacing is in the range of from about 0.002 to about 0.075 inch.

The drying step is typically carried out at a temperature in the range of from about 200 to 350 degrees F. for a time of from about one to five minutes, the higher temperature requiring shorter drying times and vice versa.

As noted above, to improve ductility and mechanical strength while concomitantly reducing pore size, the dried, filled support may be compressed prior to sintering. Alternatively or in combination with this pre-sintering compression step, the sintered porous article or structure can itself be compressed. The compression prior to sintering increases the number of points of contact and increases the area of contact between particles, resulting in a product of increased strength. As with compression prior to the sintering step, compression subsequent to sintering tends to reduce pore sizes and the thickness of the material, thereby allowing corrugation about smaller radii. Additionally, a compression or calendering step subsequent to sintering serves to tailor the pore size of the article and provide a smooth surface as may be desired for a finished product. In general, it has been found that the reduction in thickness of the material on any given pass through calendering rolls should not exceed 60 percent, i.e., the thickness should not be reduced by more than 60 percent of its pre-calendered thickness, to avoid damage to the structure, e.g., breaking of wires in the wire mesh screen, curling up, or elongating of the material in an uneven manner. If desired, reiterative sequential sintering followed by calendering steps can be used to reduce the thickness of the porous article with each calendering step being tailored to avoid reducing the thickness by more than 60 percent. The spacing of the calendering rolls will typically lie in the range of from about 0.001 to about 0.065 inch.

The sintering step itself is preferably carried out at a temperature high enough to promote solid state diffusion of metal atoms from one particle to another to form the sintered bonds. For stainless steel metal particulate, a temperature in the range of from about 1,600 to about 2,500 degrees F., more preferably from about 1,900 to about 2,375 degrees F. for a period of time of from about 0.5 to about 2 hours has been found adequate. Preferably, the sintering step is carried out under a pure hydrogen, or other reducing atmosphere or in a vacuum.

When lower melting materials are used, such as bronze, lower sintering temperatures may be used. For example, with bronze, temperatures in the range of from about 1,400 to about 1,900 degrees F. are adequate.

While the sintering step is preferably carried out at a temperature high enough to promote solid state diffusion as noted above, it can also be carried out using liquid phase sintering at relatively lower temperatures, e.g., using silver with stainless steel particulate or tin with copper.

The invention will be better understood by reference to the following examples, which are offered by way of illustration.

General Procedure Followed In Examples 1 To 11:

Examples 1 to 11 below were carried out using a system similar to that described in FIG. 1 except that the wire mesh screen was lightly calendered in a separate initial step and the wire mesh screen, after passing through the calendering or compression rolls 25 and 26, was wound up on a take-up roll prior to a subsequent sintering step. Also, in Examples 7-11, the impregnation step was carried out manually on a shorter length of screen in a manner simulating the apparatus of FIG. 1. All the screens used were made of austenitic stainless steel containing less than 0.03 weight percent carbon.

The general procedure of Examples 1 to 11 below was as follows.

Forty-two parts by weight of austenitic stainless steel powder containing less than 0.03 weight percent carbon and having the particle size specified in each of the Examples 1 to 11 below was added to the appropriate amount of a mixture of 0.9 percent by weight Carbopol 934 in water. The resulting mixture was then stirred with a paddle stirrer for about ten minutes. After the stainless steel powder was uniformly dispersed in the Carbopol 934/water mixture, a sufficient amount of a 28 percent by weight solution of ammonium hydroxide in water was added to the mixture with continuous mixing to increase the viscosity from about 100 to about 10,000 centipoise. Viscosities were measured using a Brookfield viscometer and corresponded generally to those cited for Carbopol 934 by its manufacturer. Mixing was continued for an additional period of about one-half hour to insure the formation of a uniform stabilized suspension of the stainless steel powder prior to its use.

As previously noted, a roll of wire mesh screen (about 100 feet long in the case of Examples 1-6) having the characteristics as specified in each of Examples 1 to 11 was, except as noted, lightly calendered in a separate initial step to the thickness specified in each of the Examples to obtain the desired thickness for the screen prior to impregnation with the stabilized suspension of the stainless steel powder.

The lightly calendered wire mesh screen was then threaded through the rolls in the container 15 and, except as noted, passed through the doctor blades set at the spacing specified in each of Examples 1 to 11 and then through the drying chamber, following which it was passed around the roll 40 and through calendering rolls 25 and 26 and then onto a take-up roll. The calendering rolls were set to the appropriate gap, as set out in each of Examples 1 to 11, for compressing the dried filled wire mesh screen to the desired thickness. Once the wire mesh screen had been appropriately threaded through the system as indicated above, the container 15 was filled with the stabilized suspension of the stainless steel powder to the level indicated in FIG. 1 and the powered calendering rolls 25 and 26 were started up. The rate of travel of the wire mesh screen was such as to provide a drying time in the drying chamber 24 (which was held at a temperature of 300 degrees F.) of about two minutes.

Following passage of the dried, filled wire mesh screen through the calendering rolls, the calendered wire mesh screen was rolled up on the take-up roll and then, in a separate, subsequent step, sintered for about one-half hour in hydrogen.

The mean pore diameter ratings were then determined for the products formed, with the results shown in the Examples.

EXAMPLES 1

In this example the stainless steel powder had a particle size which would pass through a 200 mesh U.S. Standard sieve but which would not pass through a 325 mesh U.S. Standard seive (nominal particle diameter of 59 micrometers).

The stainless steel powder had an apparent density of 2.50 grams/cm$^3$ corresponding to a voids volume of 68.9 percent.

19.07 kg or 19,070 grams or 7,628 cm$^3$ of the powder was combined with a quantity of a 0.9 weight percent solution of Carbopol 934 in water such that the Carbopol 934/water mixture would exactly fill the voids in the powder. Since 7,628 cm$^3$ of the powder has a voids volume of 68.9 percent or 5,256 cm$^3$, the weight of Carbopol 934/water mixture used was 5,256 grams and the weight ratio of the powder to the Carbopol 934/water mixture was 19,070/5,256=3.63:1.

Carbon contained in the suspending vehicle as a percentage of the stainless steel powder is calculated as follows. The carbon content of Carbopol 934 is about 50 percent by weight. Hence, the total weight of carbon added is 5256×0.009×0.5 or 23.6 grams. As a percentage of the stainless steel powder, this comes to:

$$23.6/19,090 \times 100 = 0.12 \text{ percent.}$$

A 100 foot long by 11.75 inches wide roll of 20×20×0.014 square weave austenitic stainless steel wire mesh screen, i.e., the wire mesh screen had 20 wires per inch in each direction with each wire having a diameter of 0.014 inch, was lightly calendered from its starting thickness of 0.028 inch to 0.025 inch and then impregnated with the stabilized suspension described above. The doctor blades were set at a spacing of 0.025 inches and the compression rolls were set at a spacing of 0.015 inch which compressed the filled dried screen by 40 percent, i.e., from 0.025 inch to 0.015 inch. In a subsequent step the compressed dried screen was sintered at a temperature of 2,100 degrees F. in hydrogen for one-half hour.

The resulting porous structure had an F2 rating of 20 micrometers and a measured carbon content of 0.013 percent.

EXAMPLES 2-11

The porous articles of Examples 2-6 were prepared in a manner generally similar to Example 1 from the components and under the processing conditions as set out in Tables Ia-Id. Examples 7-11 were similarly prepared (using the components and processing conditions set out in Tables Ia-Id) except that, as noted above, the impregnation step was done manually in a manner simulating the apparatus of FIG. 1. The properties of the resulting porous articles are set out in Table II.

TABLE Ia

| Example | Particle Size of Stainless Steel and Apparent Density | Weight Ratio of Metal Powder to the Impregnating Solution (Carbopol 934 Plus Water) |
|---|---|---|
| 2 | −500 mesh nominal particle diameter 25 micrometers, 2.88 gm/cm$^3$ | 4.5:1 |
| 3 | −500 mesh, nominal particle diameter 25 micrometers, 2.88 gm/cm$^3$ | 4.5:1 |
| 4 | −500 mesh, nominal particle diameter 25 micrometers, 2.88 gm/cm$^3$ | 4.5:1 |
| 5 | −200, +325 mesh* nominal particle diameter 59 micrometers, 2.48 gm/cm$^3$ | 3.59:1 |
| 6 | same as Example 5 | 3.59:1 |
| 7 | −100, +200 mesh, nominal particle diameter 111 micrometers, 2.32 gm/cm$^3$ | 3.26:1 |
| 8 | same as Example 2 | 4.5:1 |
| 9 | nominal particle diameter 20 micrometers, 2.56 gm/cm$^3$ | 3.76:1 |
| 10 | −325 mesh, nominal particle diameter 34 micrometers, 2.86 gm/cm$^3$ | 4.4:1 |
| 11 | −200, +325 mesh, nominal particle diameter 59 micrometers, 2.48 gm/cm$^3$ | 3.59:1 |

*As used herein, this nomenclature, i.e., −200, +325 mesh, refers to the characteristics of the particulate material. In this specific instance it passes through a 200 mesh U.S. standard sieve but does not pass through a 325 mesh U.S. standard sieve.

TABLE Ib

| Example | Wire Mesh Screen | Calendered Prior to Impregnation to Thickness, Inches |
|---|---|---|
| 2 | 84 × 84 × 0.0035 inches | 0.006 |
| 3 | 42 × 42 × 0.0055 inches | 0.009 |
| 4 | 165 × 165 × 0.0019 inches | 0.0035 |
| 5 | 42 × 42 × 0.0055 inches | None |
| 6 | 42 × 42 × 0.0055 inches | None |
| 7 | 4 × 4 × 0.023 inches | 0.042 |
| 8 | 165 × 165 × 0.0019 inches | 0.0035 |
| 9 | 120 × 120 × 0.0026 | 0.0045 |
| 10 | 120 × 120 × 0.0026 | 0.0045 |
| 11 | 20 × 20 × 0.014 | 0.025 |

TABLE Ic

| Example | Doctor Blade Spacing (inches) | Calendering Rolls Spacing (inches) |
|---|---|---|
| 2 | 0.006 | 0.005 |
| 3 | 0.009 | 0.004 |
| 4 | 0.004 | 0.002 |
| 5 | 0.011 | 0.010 |
| 6 | 0.018 | 0.009 |
| 7 | 0.042 | 0.020 |
| 8 | 0.004 | article was not calendered at all after drying step (final thickness, 0.006 inches) |
| 9 | 0.005 | 0.004 |
| 10 | 0.005 | 0.004 |
| 11 | 0.030 | 0.015 |

TABLE Id

| Example | Sintering Temperature Degrees F | Sintering Time |
|---|---|---|
| 2 | 2,050 | ½ hour |
| 3 | 2,050 | ½ hour |
| 4 | 2,050 | ½ hour |
| 5 | 2,300 | 2 hours |
| 6 | 2,300 | 2 hours |
| 7 | 2,100 | ½ hour |
| 8 | 2,050 | ½ hour |
| 9 | 2,150 | 1 hour |
| 10 | 2,150 | 1 hour |
| 11 | 2,150 | 1½ hours |

TABLE II

| Example | F2 Removal Rating, Micrometer |
|---|---|
| 2 | 2.8 |
| 3 | 2.8 |
| 4 | 0.8 |
| 5 | 29.5 |
| 6 | 13.7 |
| 7 | 30 |
| 8 | 10 |
| 9 | 7.9 |
| 10 | 9.5 |
| 11 | 17.2 |

The carbon content of Example 9 was measured at under 0.01 percent. All the products of Examples 1 through 11 will contain under 0.025 weight percent of carbon. The porous article of Example 2 was corrugated about a radius of 0.02 inch with the height of the corrugations being 0.136 inch and with a total of 14 corrugations per inch. The corrugated medium was tested for integrity and found to have the same maximum pore diameter as the article had prior to corrugation, i.e., it had maintained its structural integrity since its pore rating was the same after corrugation as before. The porous articles of Examples 5 and 6, which were, respectively, 0.010 and 0.009 inch thick, were corrugated about a radius of 0.020 inch with the height of the corrugations being 0.180 inch and with a total of 20 corrugations per inch.

EXAMPLE 12

The filter medium of this Example was prepared in a manner generally similar to Example 1 using an austenitic stainless steel powder of nominal dimension 10 micrometers and a carbon content of less than 0.03 weight percent and, as the foraminate metal support, an austenitic stainless steel wire mesh screen having a carbon content of less than 0.03 weight percent and having 0.0035 inch diameter wires in a square weave with a count of 84 wires per inch. The screen was not calendered to reduce its thickness prior to filling its openings with the stabilized suspension of the dispersed powder and passing it through the doctor blades set at a spacing of 0.009 inches.

After drying, the thickness was reduced by calendering to 0.007 inch, followed by sintering for 45 minutes in hydrogen at 2,050 degrees F. The article was then calendered to a thickness of 0.0055 inches and then resintered for 30 minutes at 2,050 degrees F.

The resulting article prepared as described above (and in a manner generally similar to Example 1) was then formed into a pleated filter element by the following procedure.

A 9.6 inch wide strip of the resulting porous article or structure, together with a 9.6 inch wide layer of pre-annealed 42×42×0.0055 stainless steel mesh screen, was fed into a corrugating machine set to fold the porous article firmly over the 42×42×0.0055 mesh, which in turn was folded back on itself, while maintaining a 0.15 inch open space on the other side of the formed pleat. Twenty-eight such pleats, each 0.400 inch deep, were formed. This pleated structure was wrapped about a perforated metal filter core 9.8 inches long and having an outside diameter of 1.80 inches. The two ends of the resulting porous structure were then welded together. This assembly, in turn, was resin-bonded into stainless steel end caps. The 42×42×0.0055 mesh screen was downstream at assembly and the 0.15 inch upstream open space was capable of collecting a filter cake up to about 0.07 inch thick. Effective filter area was 1.5 square feet.

The filter element so formed was placed in an appropriate filter housing provided with inlet and outlet fittings. The housing was then plumbed into a system in which a suspension under pressure was pumped from one tank through the filter into a second tank.

A suspension containing 120 parts per million of zirconium oxide and 20 parts per million of iron oxide in water was placed in the first tank. The zirconium oxide particulate material had particle diameters which were 99 percent under 1 micrometer. The iron oxide particulate material had particle diameters which were essentially 100 percent smaller than 4 micrometers. The dispersion, which had a turbidity of 750 nephelos turbidity units (NTU), was of the type most difficult to filter, with no evidence of flocculation and a very low settling rate.

This suspension was passed at a rate of 0.37 gallon per minute through the filter. Initial effluent had an initial turbidity of 65 NTU, as measured using an RAI Research Model TN 1000 turbidity meter. Within 1.5 minutes the turbidity fell to 1 NTU and after 10 minutes to 0.5 NTU, which was equal to that of the water used to prepare the suspension. Pumping was continued until the pressure drop across the filter rose to 40 psi by which time the space upstream of the filter was well filled with collected cake.

In order to form the pleats used in this element, the filter medium had been formed about a radius of 0.011 inch, which is twice the thickness of the filter medium.

As may be seen from the filtration results, the integrity of the medium was maintained despite the severe deformation to which it was subjected.

EXAMPLE 13

Hastelloy X powder and Hastelloy X woven wire mesh are processed in the manner of Example 1 with appropriate adjustments of the sintering temperature. The product will have characteristics comparable to the product of Example 1 except for the greater resistance to corrosion of Hastelloy X.

EXAMPLE 14

The double sintered porous metal article or structure of Example 12 is formed about a 0.125 inch diameter hard rolled copper rod with the two ends overlapped about 0.06 inch and is then resistance-welded at the overlap. After withdrawal of the copper rod, the product is a porous tube with an inside diameter of 0.125 inch.

Sintering:

Because of the interparticle binding prior to sintering, whether the product is compressed or not, there is no need to support the particles within the openings of the mesh or other support during sintering. As a consequence, the porous articles in accordance with this invention may be sintered by the conventional methods of the art, two of which are described below as representative.

(1) Using a conventional hump-back or, alternatively, a horizontal belt furnace capable of providing a reducing atmosphere at suitable temperatures, the unsintered porous metal article may be unwound directly onto an appropriate metal conveyor belt and carried through the furnace. As the porous article is carried through the furnace it is brought to a prescribed sintering temperature and maintained at that temperature for 15 to 30 minutes. The porous metal article as made will be free of foreign particulate matter.

(2) Using a conventional atmosphere or bell type vacuum furnace capable of providing suitable sintering temperatures, the unsintered porous metal article may be processed by draping it over metal or ceramic rods and then sintered.

By sintering the porous metal article as described above, a structure free of foreign particles adherent to its outer surfaces can be obtained.

Use Of Setters:

An important advantage of the process of this invention is that sintering can be carried out without the use of setter materials. The term "setter" refers to inert powders, such as aluminum oxide, silicon oxide, or mixtures thereof, often used to support a product during sintering. In accordance with this invention, the need for a setter material is obviated because the product is self-contained and self-supporting prior to and during sintering. Accordingly, the sintering step can be carried out without contact with ceramic particulate material and the surfaces of the resulting article are free of adherent ceramic particulate material.

The disadvantages inherent in the use of setter materials include:

(a) Particles of which the setter is composed often cling to the product surfaces after sintering and are sometimes very difficult to remove.

(b) The setter increases the mass to be heated and cooled. This results in a longer sintering cycle and uses more reducing gas or requires greater vacuum pumping capacity. It also requires more energy input for heating and more coolant (e.g., water or air) for cooling. It also decreases the cooling rate, which is desired to be as rapid as possible as rapid cooling improves resistance to corrosion in alloys sensitive to carbon content.

(c) In order to obtain good sintering, the furnace atmosphere (if a reducing gas such as hydrogen is used) must be maintained at a high degree of purity, or the degree of vacuum (if a vacuum furnace is used) must be adequate. The presence of setters tends to degrade both atmosphere purity and vacuum.

(d) For a hydrogen atmosphere to be effective it must be in good contact with all parts of the material to be sintered. Setter materials tend to inhibit good contact by hindering diffusion of hydrogen to the porous material and by hindering diffusion of the reduction products such as water vapor and methane away from the porous material.

For these reasons, use of setter material is best avoided.

Industrial Applicability:

The porous metal articles in accordance with this invention find use in a variety of industrial filtration applications including recovery of catalyst in a wide variety of fluidized bed processes, general filtration applications including the filtration of corrosive materials such as nitric acid, the filtration of suspensions containing metal oxides and resins used in magnetic tape manufacture, and in the filtration of molten resin used in the manufacture of polymeric films and fibers.

Additionally, the porous metal articles in accordance with this invention may be used in various filtration applications such as in the manufacture of synthetic fuels, coal gasification and the like. They may also be used for solids recovery in liquid service (backwash) applications such as in the manufacture of chemicals by hydrogenation. Also, they find use in non-filtration applications such as transpiration cooling, sparging of gases into liquids, as a support in a fluidized bed reactor, in sound attenuation, the coalescing of liquids from gases and of liquids from liquids, e.g., water from oil, flow restrictors and gas diffusers and in boundary layer control applications.

I claim:

1. A porous metal article comprising a foraminate metal support and metal particulate contained within the openings in said support, the individual particles of said metal particulate bonded to each other and to said support and said particles are no more than one-fifth the size of the smallest dimension of the opening.

2. The porous article of claim 1 wherein said foraminate metal support is austenitic stainless steel and said metal particulate is austenitic stainless steel powder, and said article has a carbon content of less than about 0.08 percent by weight.

3. The porous article of claim 1 wherein said foraminate metal support is stainless steel, said metal particulate is stainless steel, and said article is capable of being formed about a bending radius of five or less times the thickness of said article while maintaining its structural integrity.

4. The porous article of claim 1 wherein said foraminate metal support is stainless steel, said particulate is stainless steel, and said article is free of adherent surface particles of metal oxides.

5. The porous article of claim 1 wherein said foraminate support is stainless steel and said particulate is stainless steel.

6. The porous article of claim 5 in which the foraminate support is woven stainless steel wire mesh screen.

7. The porous article of claim 6 in which said stainless steel wire mesh screen has been reduced in thickness prior to filling with stainless steel particulate.

8. The porous metal article of claim 6 wherein said wire mesh screen has a weave count in the range of $4 \times 4$ to $635 \times 635$.

9. The porous metal article of claim 8 wherein said metal particulate has particle sizes in the range of from about 1 to about 200 micrometers.

10. The porous metal article of claim 9 wherein said porous metal article has a thickness in the range of from about 0.001 to about 0.05 inch.

11. The porous metal article of claim 10 wherein said article is capable of being formed about a bending radius of three or less times the thickness of said article while maintaining its structural integrity.

12. The porous metal article of claim 9 wherein said porous metal article has a thickness in the range of from about 0.001 to about 0.125 inch.

13. The porous metal article of claim 9 wherein said porous metal article has an F2 pore rating at beta=100 of from about 0.1 to about 50 micrometers.

14. The porous metal article of claim 9 wherein said article has a carbon content of less than about 0.03 weight percent.

15. The porous metal article of claim 1 in pleated form in which the pleats are formed to a radius of 5 or less times the metal thickness.

16. The porous metal article of claim 1 in pleated form in which the pleats are formed to a radius of 3 or less times the metal thickness.

17. A porous metal article comprising a stainless steel wire mesh screen and stainless steel powder contained within the mesh openings of said screen, said stainless steel powder having a particle size in the range of from about 5 to about 160 micrometers, the individual particles of said stainless steel particles are sinter-bonded to each other and to said screen, and said article has an F2 pore rating at beta=100 of from about 0.1 to about 50 micrometers.

18. The porous metal article of claim 17 wherein said screen is austenitic stainless steel, said stainless steel powder is austenitic stainless steel and the carbon content of said article is less than about 0.08 weight percent.

19. The porous metal article of claim 17 wherein said article is capable of being formed about a bending radius of 5 or less times the thickness of said article while maintaining its structural integrity.

20. The porous metal article of claim 17 wherein said article is capable of being formed about a bending radius of 3 or less times the thickness of said article while maintaining its structural integrity.

21. The porous metal article of claim 17 wherein said wire mesh screen has a weave in the range of from about 4×4 to about 635×635.

22. A porous metal article comprising a foraminate metal support and metal particulate contained within the openings in said support, the individual particles of said metal particulate bonded to each other and to said support, said article capable of being formed about a bending radius of 5 or less times the thickness of the article while maintaining its structural integrity.

23. The porous article of claim 22 wherein said foraminate metal support is austenitic stainless steel and said metal particulate is stainless steel powder, and said article has a carbon content of less than about 0.08 percent by weight.

24. The porous article of claim 22 wherein said foraminate metal support is stainless steel, said particulate is stainless steel, and said article is capable of being formed about a bending radius of 3 or less times the thickness of said article while maintaining its structural integrity.

25. The porous article of claim 22 wherein said foraminate metal support is stainless steel, said particulate is stainless steel, and said article is free of adherent surface particles of metal oxides.

26. The porous article of claim 22 wherein said foraminate support is stainless steel and said particulate is stainless steel.

27. The porous article of claim 26 in which the foraminate support is woven stainless steel wire mesh screen.

28. The porous article of claim 27 in which said stainless steel wire mesh screen has been reduced in thickness prior to filling with stainless steel particulate.

29. The porous metal article of claim 27 wherein said wire mesh screen has a weave count in the range of 4×4 to 635×635.

30. The porous metal article of claim 29 wherein said metal particulate has particle sizes in the range of from about 1 to about 200 micrometers.

31. The porous metal article of claim 30 wherein said porous metal article has a thickness in the range of from about 0.001 to about 0.05 inch.

32. The porous metal article of claim 31 wherein said article is capable of being formed about a bending radius of three or less times the thickness of said article while maintaining its structural integrity.

33. The porous metal article of claim 30 wherein said porous metal article has a thickness in the range of from about 0.001 to about 0.065 inch.

34. The porous metal article of claim 30 wherein said porous metal article has an F2 pore rating at beta=100 of from about 0.1 to about 50 micrometers.

35. The porous metal article of claim 30 wherein said article has a carbon content of less than about 0.03 weight percent.

36. The porous metal article of claim 22 in pleated form in which the pleats are formed to a radius of 5 or less times the metal thickness.

37. The porous metal article of claim 22 in pleated form in which the pleats are formed to a radius of 3 or less times the metal thickness.

* * * * *